(12) United States Patent
Yoshizawa

(10) Patent No.: US 6,279,347 B1
(45) Date of Patent: Aug. 28, 2001

(54) METHOD AND APPARATUS FOR PRODUCING BENT GLASS SHEET

(75) Inventor: Hideo Yoshizawa, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/530,534

(22) PCT Filed: Nov. 6, 1998

(86) PCT No.: PCT/JP98/05017

§ 371 Date: Jul. 12, 2000

§ 102(e) Date: Jul. 12, 2000

(87) PCT Pub. No.: WO99/24373

PCT Pub. Date: May 20, 1999

(30) Foreign Application Priority Data

Nov. 6, 1997 (JP) .................................................. 9-304565
Nov. 26, 1997 (JP) .................................................. 9-324330

(51) Int. Cl.[7] .............................................. C03B 23/033
(52) U.S. Cl. ................. 65/102; 65/104; 65/106; 65/118; 65/185; 65/186; 65/256; 65/257; 65/268; 65/286; 65/287; 65/289; 65/290; 65/291; 425/335; 425/373
(58) Field of Search .............................. 65/102, 104, 106, 65/118, 185, 186, 256, 257, 268, 286, 287, 289, 290, 291; 425/335, 373

(56) References Cited

U.S. PATENT DOCUMENTS

| | | |
|---|---|---|
| 4,292,065 | 9/1981 | Nedelec et al. . |
| 4,318,728 | 3/1982 | Claassen . |
| 4,666,496 | 5/1987 | Fecik et al. . |
| 4,904,294 | 2/1990 | Schultz et al. . |
| 4,957,528 | 9/1990 | Letemps et al. . |
| 4,983,205 | 1/1991 | Kuster et al. . |
| 5,022,907 | 6/1991 | Vanaschen et al. . |

FOREIGN PATENT DOCUMENTS

| | | |
|---|---|---|
| 39 08 644 C1 | 3/1990 | (DE) . |
| 39 28 968 C1 | 1/1991 | (DE) . |
| 41 04 086 C1 | 2/1992 | (DE) . |
| 0 346 197 | 12/1989 | (EP) . |
| 55-75930 | 6/1980 | (JP) . |
| 3-50132 | 3/1991 | (JP) . |
| 6-40732 | 2/1994 | (JP) . |
| 7-237928 | 9/1995 | (JP) . |

OTHER PUBLICATIONS

International Search Report dated Jan. 21, 1999.

*Primary Examiner*—Michael Colaianni
(74) *Attorney, Agent, or Firm*—Merchant & Gould P.C.

(57) ABSTRACT

This invention provides a method and an apparatus for producing a bent glass sheet. A heated glass sheet (4, 24, 24\*) conveyed from a heating furnace (1, 21) is bent by pressing with at least one belt (5, 9, 25) made of a heat-resistant material against a bending member (6, 10, 26, 28). The bent glass sheet is further conveyed and cooled for quenching or annealing in a cooling apparatus (3, 23). The bent glass is cooled after separating the belt. According to this invention, the bent glass sheets having surfaces on which defects, such as marks of rolls, are suppressed can be produced efficiently.

31 Claims, 14 Drawing Sheets

METHOD AND APPARATUS FOR PRODUCING BENT GLASS SHEET

FIELD OF THE INVENTION

The present invention relates to a method and an apparatus for producing a bent glass sheet. More specifically, the present invention relates to a method and an apparatus for producing a bent glass sheet useful for a window of a building, a vehicle and the like. The bent glass sheet can be used as a bent and tempered glass by quenching when necessary.

BACKGROUND OF THE INVENTION

A bent glass sheet is commonly used for automobiles and buildings. Especially, in the field of window glass sheets for automobiles, the bent glass sheet is in great demand because of the advantages in the design of an automobile, aerodynamic characteristics or the like. A lass sheet that is mass-produced primarily by a float glass process has a flat shape at first. The flat glass sheet is formed into a bent glass sheet by bending the flat glass sheet in a secondary process by various industrial techniques. In the process of forming a bent glass sheet involving heating, the bent glass sheet tends to be quenched for tempering after or while bending.

A method for forming a bent glass sheet that is commonly used is to press a heated glass sheet between a pair of dies. For example, a glass sheet is conveyed from a heating furnace to a press molding device while being suspended from tongs (a load handling device). In connection with this method, in order to avoid generating tong marks on the surfaces of the glass sheet, it is common that a heated glass sheet is conveyed to the forming device horizontally by rolls or the like. In general, rolls are used for conveying the glass sheet horizontally but a belt is used in some cases.

For example, Japanese Laid-Open Patent Publication (Tokkai Hei) No. 3-50132 (JP A 3-50312) discloses a method in which a glass sheet retrieved from a heating furnace is conveyed by a belt to a bending section In the bending section, the heated glass sheet is pressed between upper and lower press dies together with the belt. This method is performed by an apparatus as shown in FIG. 14. In this method, a glass sheet 104 retrieved from a heating furnace 101 is conveyed to a bending section 102 in the horizontal direction. The glass sheet 104 is conveyed to a position between press dies 106a, 106b by a belt 105 operated by rolls 107, followed by being pressed by the dies 106a, 106b together with the belt 105 at the pressing position. The glass sheet is quenched for tempering at the same time. After pressing, a bent glass sheet 104' is conveyed in the horizontal direction. This method utilizes the flexibility of the belt, in order to abbreviate the reduction in the temperature of the glass sheet from heating to quenching in the case where the glass sheet is quenched for tempering.

Furthermore, an improved method for bending a glass sheet with tempering is disclosed in Japanese Laid-Open Patent Publication No. 6-40732 (JP A 6-40732). In this method, in order to realize a curved shape with high accuracy an expandable casing having a flexible thin film is used as the lower press die.

In such methods for forming a bent glass sheet involving such press molding, the glass sheet stays in the press dies during molding, regardless of what is used for conveying the glass sheet.

In view of the efficiency in producing bent glass sheets successively, methods in which bending is performed without stopping the glass sheet in the production line have been proposed and are in practical use. Methods of this type include a method in which a glass sheet is heated and softened while being horizontally conveyed in the heating furnace, and the glass sheet is allowed to gradually conform with the shape of the surface of a member for conveying the glass sheet such as an air bed. This method is efficient in the case where bent glass sheets having the same curvature are produced successively, so that this method is widely employed with various modifications (e.g., Japanese Laid-Open Patent Publication No. 7-237928 (JP A 7-237928)).

Furthermore, the following method was proposed. A curvature is provided for a conveying path arranged adjacent to an outlet of a heating furnace, and a heated glass sheet is being curved while conveyed along the conveying path by rolls (Japanese Laid-Open Patent Publication No. 55-75930 (JP A 55-75930)). This method has advantages of an excellent efficiency in heating the glass sheet and enabling types (shapes) of the bent glass sheet to be changed easily compared with the method for forming a bent glass sheet utilizing the self-weight of the glass sheet as described above.

However, according to the method disclosed in JP A 55-75930, a heated lass sheet is being curved intermittently by rolls positioned on the both sides of the path for conveying the glass sheet, so that the marks of the rolls are likely to be left on the surface of the glass sheet. This disadvantageously deteriorates the quality of the bent glass sheet. The flaws and roughness on the surface of the glass sheet caused by the rolls result in optical defects that cannot be ignored, especially in the field of window glass sheets for vehicles, which is the largest use for bent glass sheets. Furthermore, in the method for bending intermittently by rolls, the degree of freedom in forming a bent glass sheet is inherently limited, so that the formable shapes are limited to a narrow range.

SUMMARY OF THE INVENTION

The present invention is carried out in view of such circumstances, and has the object of providing a method for producing a bent glass sheet by which defects hardly occur on the surface of the glass sheet. It is also an object of the present invention to provide an apparatus for producing a bent glass sheet suitable for carrying out such a method.

In older to achieve the above-mentioned object, a method for producing a bent glass sheet of the invention comprises the steps of heating a glass sheet in a heating furnace to a temperature at which the glass sheet becomes changeable in shape, and conveying the glass sheet out from the heating furnace. The method also comprises the steps of bending the glass sheet by pressing the glass sheet with at least one belt made of a heat-resistant material against a bending member, and cooling the glass sheet for quenching or annealing after separating the glass sheet from the belt.

Thus, glass sheets having surfaces on which roughness caused by roll marks is suppressed can be produced efficiently.

Furthermore, an apparatus for producing a bent glass sheet of the present invention comprises a heating furnace for heating a glass sheet to a temperature at which the glass sheet becomes changeable in shape. The apparatus also comprises a bending apparatus adjacent to the heating furnace. The bending apparatus including a bending member having a curved surface for bending the lass sheet, and at least one belt made of a heat resistant material. The belt is pressed against the curved surface of the bending member with the glass sheet when bending the glass sheet. The apparatus of the present invention also comprises a cooling apparatus for quenching or annealing the glass sheet adjacent to the bending apparatus.

The apparatus can efficiently produce glass sheets having surfaces on which roughness caused by marks of rolls is suppressed.

For producing a bent and tempered glass sheet, the glass sheet is quenched by blowing a cooling gas to the glass sheet. For producing a non-tempered bent glass sheet, the glass sheet is annealed.

In the method of the present invention, the belt is preferably kept along the surface of the glass sheet until the glass sheet separates from the belt.

In the method of the present invention, the glass sheet is preferably bent so as to have a predetermined curvature with respect to a direction in which the glass sheet is conveyed.

In the method of the present invention, the glass sheet is preferably cooled while conveying the glass sheet.

When the glass sheet is bent so as to have a predetermined curvature with respect to a direction in which the glass sheet is conveyed, the glass sheet is preferably cooled while conveying the lass sheet along an arc described by extending the curved surface of the glass sheet in the direction of travel.

In the method of the present invention, the glass sheet is preferably bent while conveying the glass sheet with the belt.

In this case, the glass sheet is preferably conveyed with the belt so that the glass sheet gradually deviates from a direction in which the glass sheet is conveyed from the heating furnace.

In the method of the present invention, the glass sheet is preferably bent while sandwiching the glass sheet between a pair of the belts.

In the method of the present invention, the glass sheet is preferably conveyed from the heating furnace to a pressing position and bent at the pressing position.

In this case, the method of the present invention preferably further comprises a step of changing an attitude of the glass sheet while supporting the glass sheet with the belt before separating the glass sheet from the belt.

In the apparatus of the present invention, the bending apparatus preferably further includes a belt driving apparatus for driving the belt with the glass sheet.

In this case, the belt driving apparatus preferably drives the belt while keeping the belt along the surface of the glass sheet. The belt driving apparatus preferably includes a roll for controlling tension of the belt.

In the apparatus of the present invention, the bending apparatus preferably has a curved conveying path for the glass sheet along the curved surface of the bending member.

In this case, it is preferable that the curved conveying path in the bending apparatus gradually deviates from a direction in which the glass sheet is conveyed from the heating furnace. The curved conveying path is preferably sandwiched between a pair of the belts.

In the apparatus of the present invention, the bending member preferably has a predetermined curvature with respect to a direction in which the glass sheet is conveyed.

In the apparatus of the present invention, the bending apparatus preferably includes a belt temperature controller.

In the apparatus of the present invention, the cooling apparatus preferably includes a curved conveying path for the glass sheet having a predetermined curvature with respect to a direction in which the glass sheet is conveyed.

DETAILED DESCRIPTION OF THE INVENTION

Hereinafter, the preferable embodiments of the present invention will be described with reference to the accompanying drawings.

Embodiment 1

Figure 1:
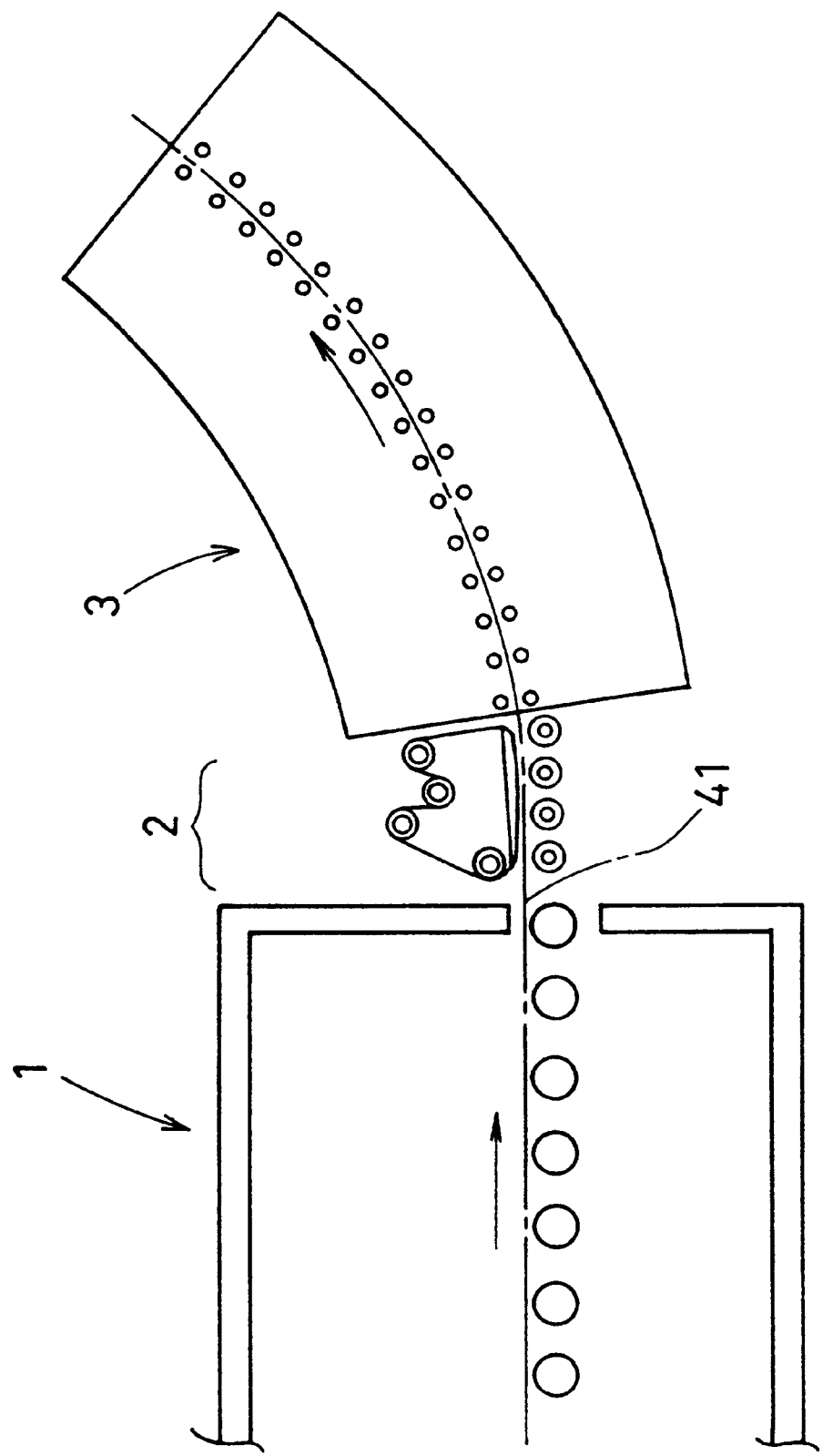
FIG. 1 is a cross-sectional view showing an embodiment of an apparatus for producing a bent glass sheet of the present invention.

FIG. 1 is a cross-sectional view showing an embodiment of an apparatus of the present invention. As shown in FIG. 1, this apparatus includes a heating furnace 1, a bending apparatus 2 and a quenching apparatus (cooling apparatus) 3, which have a common and continuous path for conveying a glass sheet 41. The conveying path for conveying the glass sheet 41 is substantially horizontal in the heating furnace 1 and gradually deviates upwardly from the horizontal direction in the bending apparatus 2 so that the conveying path has a predetermined curvature in the quenching apparatus 3.

Figure 2:
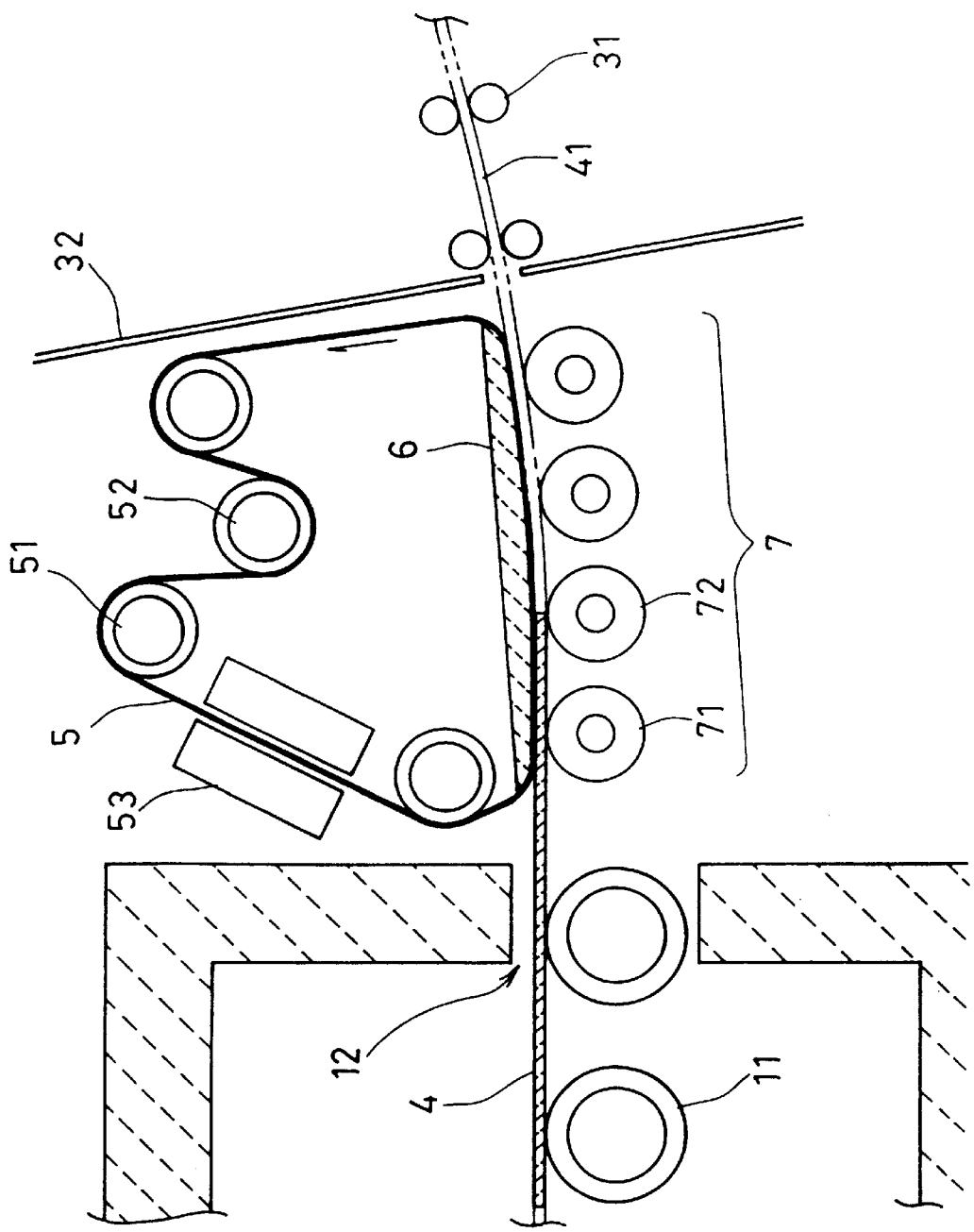
FIG. 2 is a cross-sectional view showing the vicinity of the bending section of the apparatus shown in FIG. 1.

FIG. 2 is an enlarged view of the vicinity of the bending section of the apparatus shown in FIG. 1. In the bending section, a bending apparatus 2 is provided. As shown in FIG. 2, in the bending apparatus 2. pressing rolls 7 below the conveying path 41 are opposed to a bending member 6 above the conveying path 41. A heat resistant belt 5 is provided so that the belt 5 can move between the bending member 6 and the conveying path 41 in the bending section.

The belt 5 is suspended in a loop manner by rolls and the bending member 6 so as to form an endless track. The rolls include a driving roll 51 and a tension roll 52. A driving device (not shown) is connected to the driving roll 51. The tension of the belt 5 can be maintained in a suitable state by adjusting the position of the tension roll 52. Belt temperature regulators 53 are arranged in a part of the endless track of the belt 5 on the both sides thereof. The temperature of the belt a can be regulated by heating or cooling the belt 5.

The belt 5 is made of a heat resistant material, for example, heat resistant fibers such as metal fibers, inorganic fibers, graphite fibers, aromatic polyamide fibers or the like. The belt 5 can be obtained, for example, by plain-weaving, twilling, or jersey-knit-like weaving of such heat resistant fibers. The heat resistant material can be formed into a felt or a net so as to obtain the belt 5. The belt 5 preferably has a width sufficient so as to be positioned across the entire width of the glass sheet conveying path 41.

As shown in FIG. 2, a part of the surface of the bending member 6 is in contact with the endless track on which the belt 5 travels, and a part thereof faces the conveying path 41. The surface of the bending member facing the conveying path 41 functions as a bending surface for a glass sheet. The surface has a convex shape with respect to the direction of conveying the glass sheet. As a material for the bending member 6, various metals or ceramics can be used. The bending member 6 can be integrally formed into one piece, as shown in FIG. 2, or can be formed as a combination of a plurality of separate members. Furthermore, it is preferable to provide the bending member 6 with a heater for the purpose of preventing lass sheets in the early stage of a continuous production from being adversely affected by the bending member 6 whose temperature is not sufficiently raised.

Pressing rolls 7 are provided below and along the path 41. The pressing rolls 7 act as pressing members for pressing a glass sheet in the conveying path 41 against the bending member 6. The pressing rolls 7 are connected to a position adjusting mechanism so that the pressing pressure against the bending member 6 can be controlled. The surface of the pressing rolls 7 is formed of a heat resistant material, as is the belt 5. The surface of the pressing rolls 7 is preferably formed of a material having a cushion effect for the glass sheet, such as felt or the like. Furthermore, the pressing rolls 7 are connected to a driving member (not shown) so that the pressing rolls can be driven at a peripheral velocity necessary for conveying the glass sheet. However, this is not necessary, and they may be non-driven rolls (free rolls), which can rotate with a small external force. In the case of using free rolls, it is preferable that each of the rolls can rotate independently. The number of the pressing rolls 7 can be suitably determined depending on a desired shape of the glass sheet, but in general, at least two rolls are needed. The number of the rolls is preferably at least five.

In the bending section, the conveying path 41 for a glass sheet proceeds along the belt 5 between the bending member 6 and the pressing rolls 7. The conveying path 41 in the bending section is substantially horizontal at the upstream end of the conveyance, i.e. in the vicinity of an outlet of the heating furnace 12. Then, as it proceeds in the downstream direction of the conveyance, the conveying path 41 gradually bends upwardly, and gradually deviates from the horizontal track seen at the upstream end of the conveyance. Alternatively, the conveying path 41 may be formed in such a manner that the path 41 gradually deviates downwardly from the horizontal direction. The conveying path 41 typically has a curvature which varies continuously. On the other hand, the conveying path 41 in the vicinity of the quenching apparatus is set to have a substantially constant curvature when viewed from the side of the quenching apparatus 3, and this constant curvature is successively provided for the conveying path in the quenching apparatus.

Basically, as the heating furnace 1 and the quenching apparatus 3 shown in FIG. 1, conventional apparatuses can be used. The system for conveying a glass sheet in the heating furnace 1 is not particularly limited, but rolls 11 are preferable in view of heating efficiency. The quenching apparatus 3 can receive a bent glass sheet formed in the bending section 2, and serves to quenching the bent glass sheet by blowing cooled air through a cooled air blowing nozzle (not shown) while conveying the bent glass sheet on the path having a constant curvature. In many cases, a bent glass sheet is quenched, but a bent glass sheet can be annealed on the path. Furthermore, a converter for changing the direction of conveying the glass sheet may be provided further in the downstream direction of the conveyance in the quenching apparatus 3 so that the conveyance direction can be changed to a different direction such as the horizontal direction.

Next, an example of a method for producing a bent glass sheet by using the apparatus as described above will be described below.

A glass sheet 4 made of soda-lime silica glass is heated to a temperature in the vicinity of the softening point thereof (e.g., a temperature between the strain point and the softening point of the glass) while conveyed in a horizontal direction by the rolls 11 in a heating furnace 1, and exits from the outlet 12 of the heating furnace 1 in the horizontal direction in a state of being changeable in shape. When the end of the glass sheet 4 reaches the bending section, the glass sheet 4 is sandwiched between the first pressing roll 71 that is positioned at the uppermost stream and the bending member 6, and pressed against the bending member 6 via the belt 5 by the roll 71. The surface of the pressing rolls 7 is made of a heat resistant felt material, so that the pressing rolls 7 themselves are deformed to maintain the contact area at a predetermined value or more, so as to press the glass sheet 4.

The belt 5 made of a belt cloth formed of stainless steel fibers slides on the bending surface of the bending member 6 and moves toward the downstream side in the direction of conveying the lass sheet at a constant speed, so as to guide the lass sheet 4 in the downstream direction. Then, as shown in FIG. 2, the end of the glass sheet is in contact with the second pressing roll 72. The moving speed of the belt 5 is preferably selected from the range of 80 mm/sec to 400 mm/sec. In this stage, the glass sheet 4 is substantially flat, since it has not been subjected to secondary forming yet.

The glass sheet is conveyed from the state shown in FIG. 2 further to the downstream. First, the second pressing roll 72 presses the glass sheet 4 against the bending member 6 while raising the end of the glass sheet 4 slightly upward. In this position, the bending surface of the bending member 6 recedes slightly upward, and from this point, the glass sheet 4 starts to be provided with a bend.

During the period of bending, the entire upper surface of the glass sheet 4 pressed upwardly by the pressing rolls 7 is in contact with the belt 5, so that the glass sheet 4 is conveyed in a stable state. Since the glass sheet is conveyed in a stable state and formed not intermittently but continuously, roughness is hardly generated on the surface of the glass sheet.

After being provided with a constant curvature while passing through the bending section, the glass sheet 4 is conveyed into the quenching apparatus through a slit of a partition plate 32. In the quenching apparatus, the lass sheet 4 is quenched for tempering by blowing cooling air while being conveyed by conveying rolls 31 at a constant speed. Thus, a bent and tempered glass sheet is produced. With the apparatus as shown in FIG. 2, it was possible to successively produce cylindrically curved and tempered glass sheets having a curvature of 1300 mmR.

In the above-described process, it is not necessary to stop moving a glass sheet for forming and at least one surface of the glass sheet is supported by a face during bending. Therefore, it is possible to successively and efficiently produce bent glass sheets having few defects on the surface thereof. There is no particular limitations on the thickness of the glass sheet to be formed.

Embodiment 2

Figure 3:
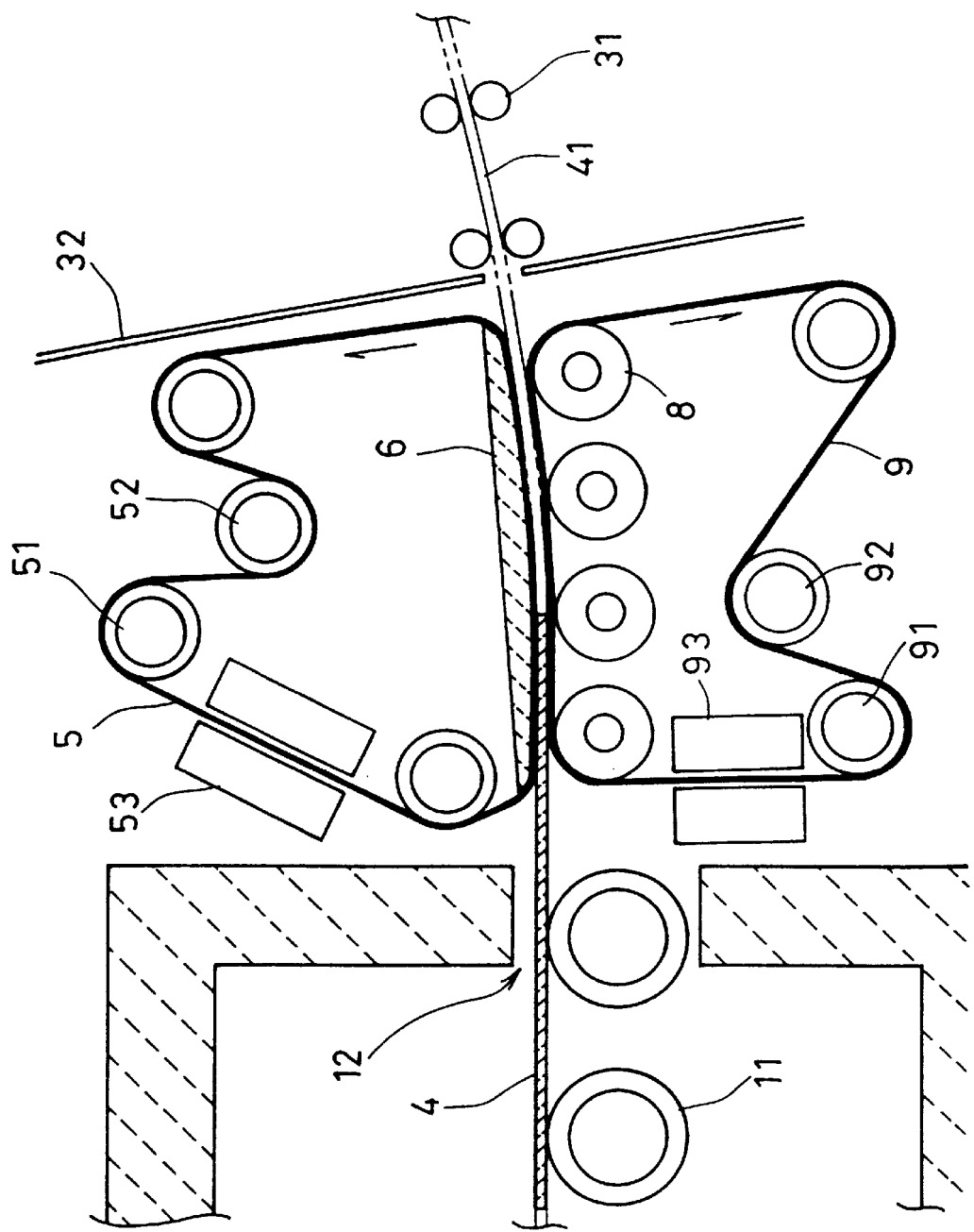
FIG. 3 is a cross-sectional view showing the vicinity of the bending section of another embodiment of the apparatus of the present invention.

FIG. 3 is a cross-sectional view showing the vicinity of the bending section of another embodiment of the apparatus of the present invention. This apparatus has the same structure as that shown in FIG. 2, except for a portion where a glass sheet is pressed upwardly.

In the apparatus shown in FIG. 3, a second belt 9 is present, in addition to a first belt 5, below the conveying path 41 on pressing rolls 8. The pressing rolls 8 press a glass sheet 4 against a bending member 6 via the belts 5, 9.

As in the case the first belt 5, the second belt 9 is suspended in a loop manner by rolls including a driving roll 91, a tension roll 92 and the pressing rolls 8, so as to form an endless track. A driving device (not shown) is connected to the driving roll 91. The tension of the second belt 9 is maintained in a suitable state by adjusting the position of the tension roll 92. Belt temperature regulators 93 are arranged in a part of the endless track of the belt 9 on both sides thereof. The temperature of the second belt 9 can be regulated by heating or cooling the belt 9. Preferable materials for the second belt 9 and a method for producing the second belt 9 are the same as for the first belt 5.

According to the apparatus shown in FIG. 3, the glass sheet 4 is conveyed while being sandwiched and pressed between the belts 5 and 9. Therefore, it is possible to further improve the state of the surface of the bent glass sheet.

Embodiment 3

Figure 4:
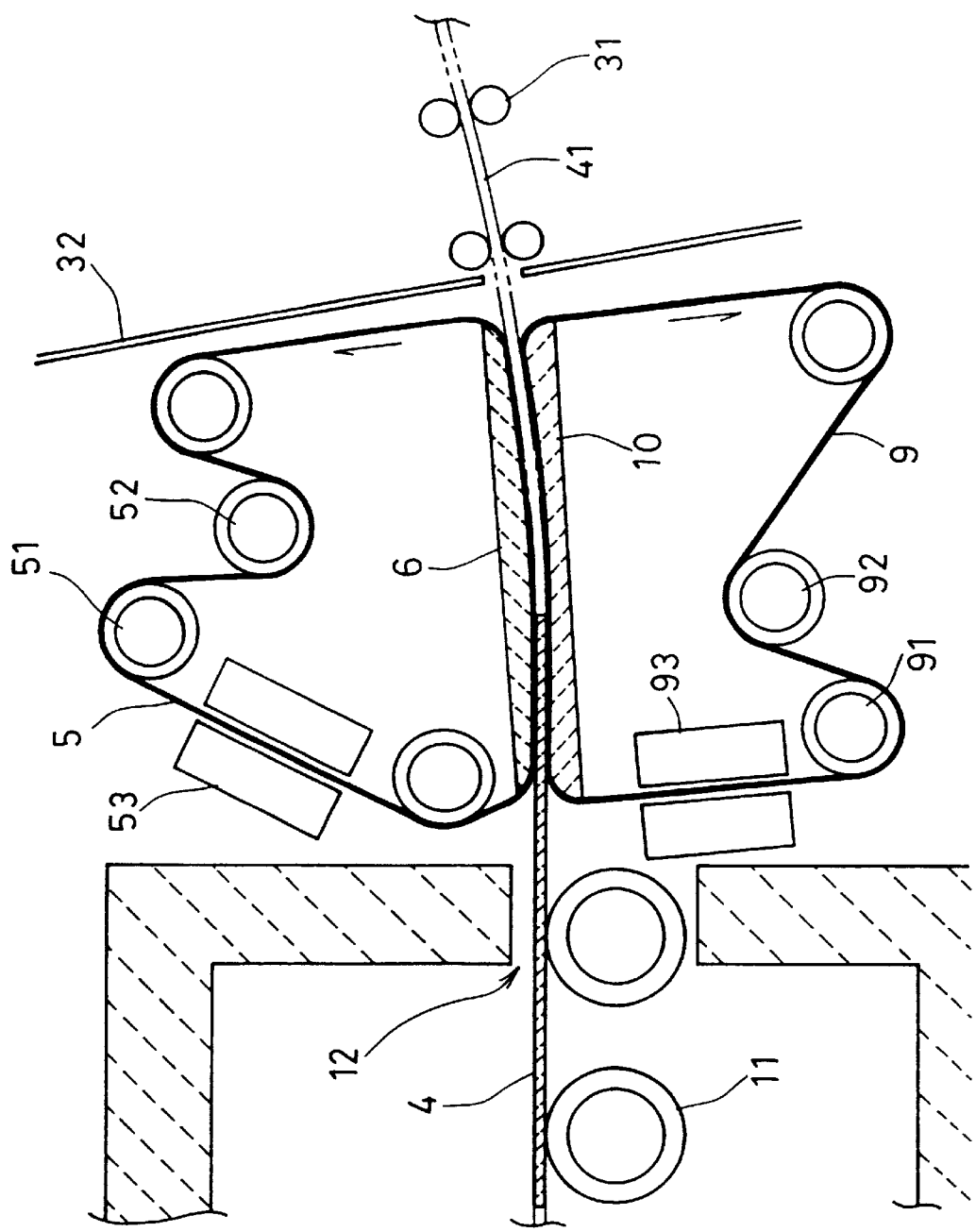
FIG. 4 is a cross-sectional view showing the vicinity of the bending section of still another embodiment of the apparatus of the present invention.

FIG. 4 is a cross-sectional view showing the vicinity of the bending section of another embodiment of the apparatus of the present invention. This apparatus has the same structure as those shown in FIGS. 2 and 3, except for a portion where a glass sheet is pressed upwardly.

In the apparatus shown in FIG. 4, a second belt 9 is present, in addition to a first belt 5, below a path for conveying a glass sheet 41 on a lower bending member 10. The lower bending member 10 presses a glass sheet 4 against an upper bending member 6 via the belts 5, 9. In this embodiment, the upper bending member 6 presses the glass sheet 4 against the lower bending member 10 at the same time. The bending surface of the lower bending member 10 has an inverted shape of the bending surface of the upper bending member 6, and the upper and lower bending members are designed so that the bending surfaces thereof can be superimposed on each other.

According to the apparatus shown in FIG. 4, the glass sheet 4 is conveyed while being sandwiched and pressed between the belts 5, 9. Therefore, it is possible to further improve the state of the surface of the bent glass sheet, as in the case of the apparatus shown in FIG. 3.

In the apparatuses having belts arranged on both sides of the glass sheet conveying path, as shown in FIGS. 3 and 4, both belts may be driven to convey the glass sheet, or one of the belts may be free and the glass sheet may be conveyed by driving only the other belt.

Embodiment 4

Figure 5:
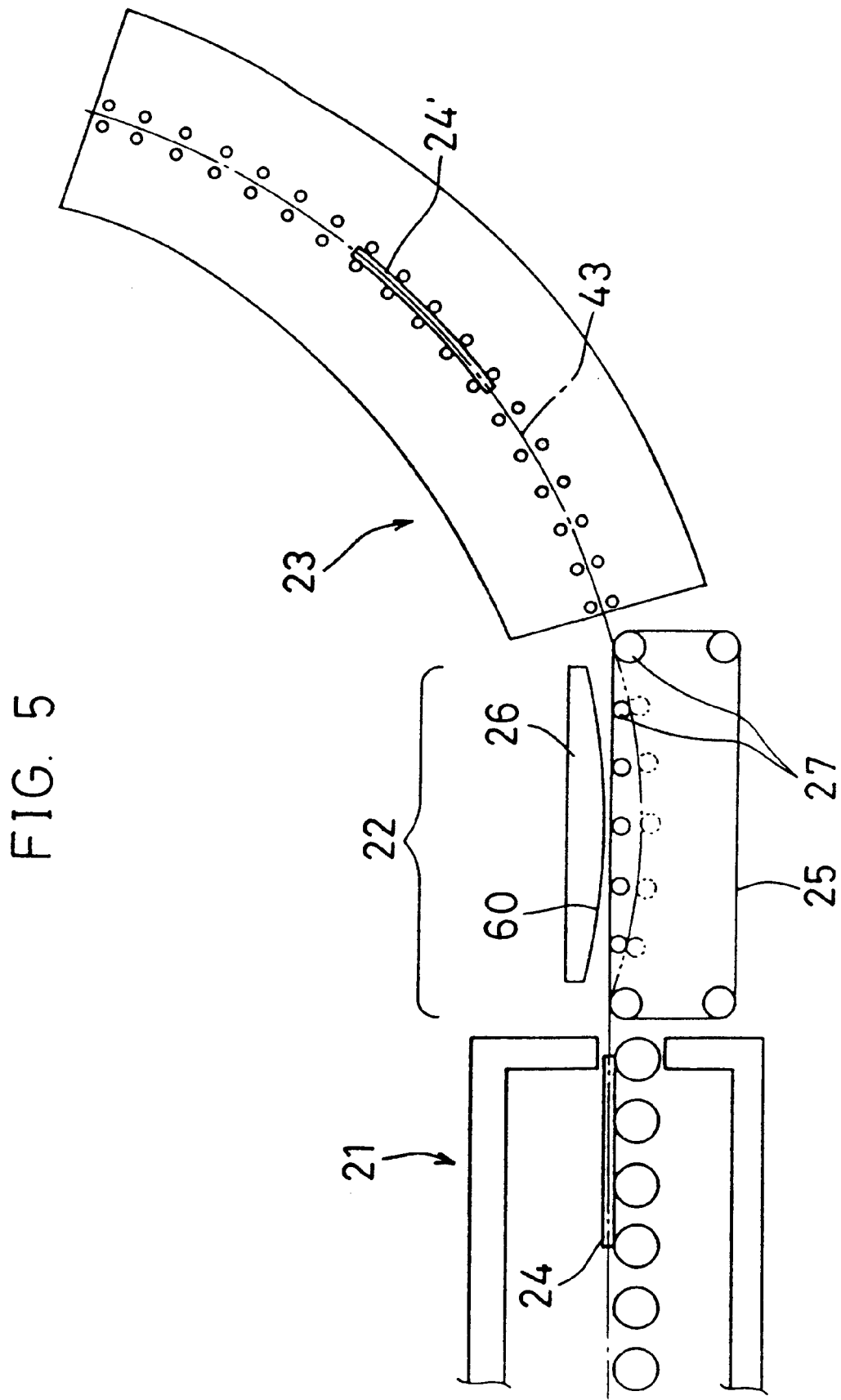
FIG. 5 is a cross-sectional view showing another embodiment of an apparatus for producing a bent glass sheet of the present invention.

FIG. 5 is a cross-sectional view showing an embodiment of an apparatus for producing a curved glass sheet of the present invention. As shown in FIG. 5, this apparatus includes a heating furnace 21, a bending apparatus 22 and a quenching apparatus (cooling apparatus) 23, which have a common path for conveying a glass sheet 24. A glass sheet 24 is heated to a temperature at which the lass sheet becomes changeable in shape (e. g., a temperature between the strain point and the softening point of the glass) in the heating furnace 21, while proceeding on the conveying path 43. Then, the glass sheet is bent in the bending apparatus 22, and quenched for tempering in the quenching apparatus 23.

The conveying path 43 is set to proceed in a substantially horizontal direction in the heating furnace 21, whereas in the quenching apparatus 23 it is set to proceed so that it forms a curve having a substantially constant curvature when viewed from the side of quenching apparatus 23. Such switching of the conveying path 43 is performed in the bending apparatus 29 More specifically, the glass sheet 24 is conveyed from the heating furnace 21 to the bending apparatus 22 in a substantially horizontal direction. Then, after being subjected to the bending process in the bending apparatus 22, in accordance with the change in the shape of the glass sheet, the glass sheet 24 is conveyed from the bending section 22 to the quenching apparatus 23 in the direction along the curve having a substantially constant curvature. The curvature provided for the conveying path 43 is set to substantially match curvature provided for the bent glass sheet 24' with respect to the conveyance direction, so that the glass sheet can be conveyed stably.

In the bending apparatus 22, a bending member 26 is positioned above the conveying path 43. On the other side, a plurality of rolls 27 are positioned below the conveying path 43. A belt 25 is suspended from the rolls 27 in a loop manner so as to form an endless track. Furthermore, at least one roll is connected to a roll driving device (not shown) so that the belt 25 can be driven at a peripheral velocity necessary for conveying the glass sheet. Rolls that are not connected to the driving device are preferably non-driven rolls (free rolls), which can rotate with small external force.

The surface of the bending member facing the conveying path 43 functions as a bending surface 60 for a glass sheet. As shown in FIG. 5, the bending surface 60 is provided with a convex shape when viewed from the side of quenching apparatus. As a material for the bending member 26, various metals or ceramics can be used. The bending member 26 can be integrally formed into one piece, as shown in FIG. 5, or can be formed as a combination of a plurality of separate members.

It is preferable to provide the bending member 26 with a heater for the purpose of preventing glass sheets in the early stage of a continuous production from being adversely affected by the bending member 26 whose temperature is not sufficiently raised.

The belt 25 can be made of a heat resistant material, for example heat resistant fibers such as metal fibers, inorganic fibers, graphite fibers, aromatic polyamide fibers or the like. The belt 25 can be obtained, for example, by plain-weaving, twilling, or jersey-knit-like weaving of such heat resistant fibers, but the present invention is not limited thereto. The heat resistant material can be formed into a felt or a net so as to obtain the belt 25.

The rolls 27 urge the glass sheets 24 together with the belt 25 upwardly, so that they act as pressing members for pressing the glass sheet against the bending surface 60 via the belt 25 during the bending process.

Furthermore, the rolls 27 in the bending apparatus 22 facing the conveying path 43 are positioned in a line in the horizontal direction so that they can support the flat glass sheet 24 via the belt 25 when receiving the glass sheet 24 from the heating furnace 21. On the other hand, during and after bending the glass sheet, the rolls 27 are positioned in accordance with the shape of the surface of the glass sheet, so that the belt 25 can press the entire surface of the glass sheet and support the glass sheet stably. Thus, the rolls 27 act also as belt supporting members. In order to operate the rolls 27 in such a manner, a position adjusting mechanism (not shown) is connected to each roll 27, so that the height of each roll 27 can be adjusted in upward and downward directions independently.

A conventional heating furnace can be used as the heating furnace 21. There are no particular limitations on a member for conveying a glass sheet in the horizontal direction, but rolls 81 are preferable to convey the glass sheet in view of heating efficiency or the like. Furthermore, basically, a conventional quenching apparatus can be used as the quenching apparatus 23, but it is preferable to use a quenching apparatus provided with a conveying path that can stably convey a glass sheet having a desired curved shape, as illustrated in FIG. 1.

Next, an example of a process of bending a glass sheet in the bending section provided with a bending apparatus 22 will be described with reference to FIGS. 6 to 11.

Figure 6:
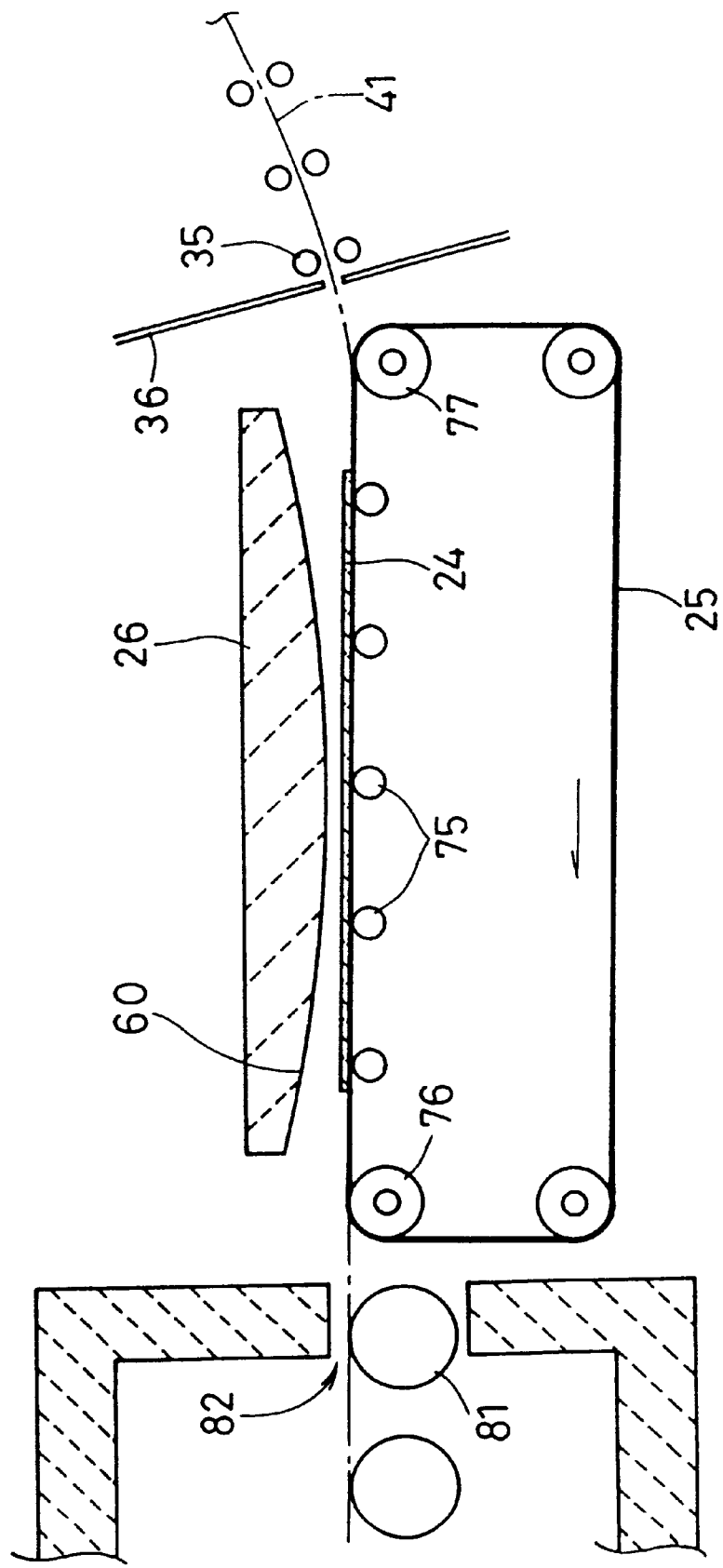
FIG. 6 is a cross-sectional view showing the vicinity of a bending section of the apparatus shown in FIG. 5.

First, the glass sheet 24 is heated to a temperature at which the glass sheet becomes changeable in shape while being conveyed in the horizontal direction by the rolls 81 in the heating furnace 21. As shown in FIG. 6, the glass sheet 24 retrieved from an outlet 82 of the heating furnace 21 is supported and conveyed to a predetermined bending position by the belt 25.

Figure 7:
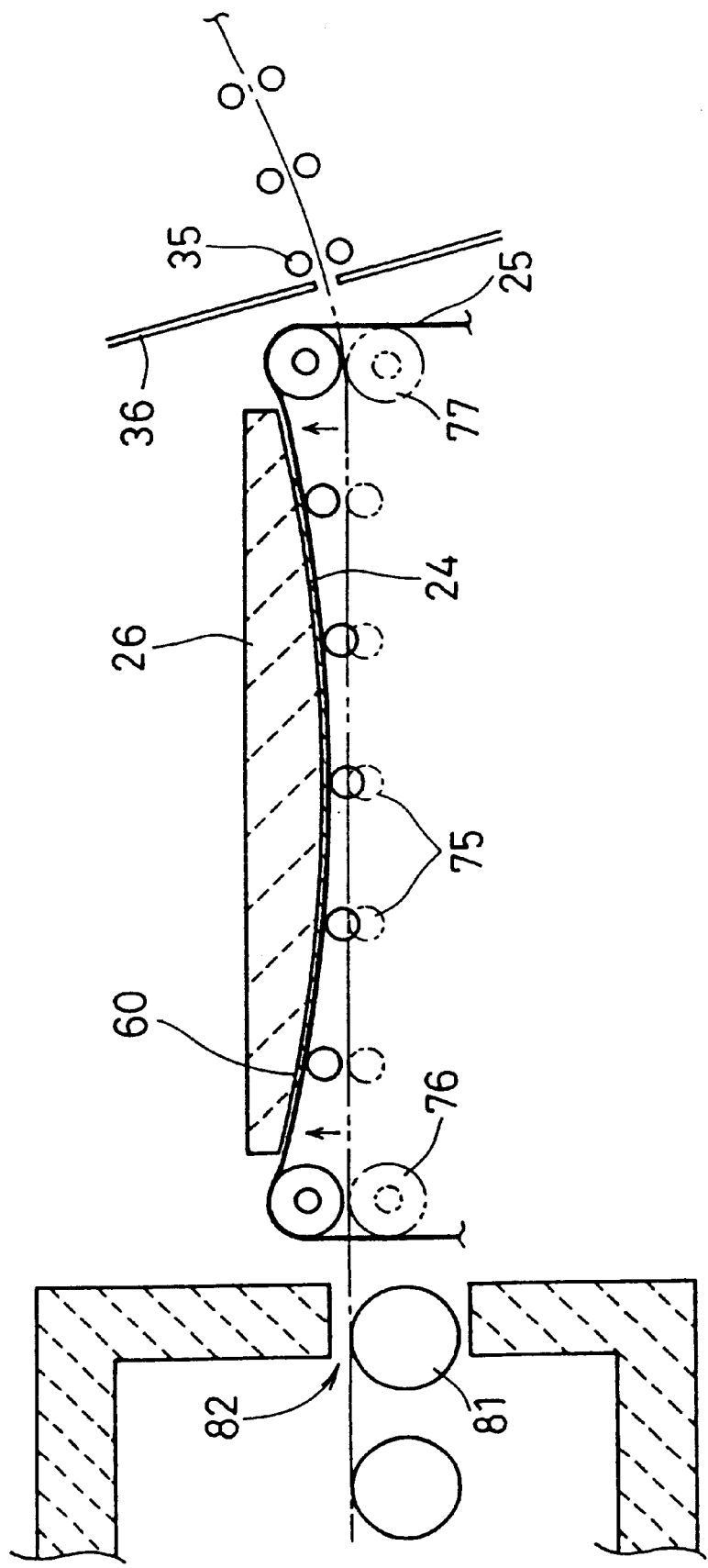
FIG. 7 is a cross-sectional view showing the state of bending a glass sheet in the bending section shown in FIG. 6.

Next, the belt 25 is raised by rolls 75, 76, 77, and the glass sheet 24 is sandwiched and pressed between the bending surface 60 of the bending member 26 and the belt 25 to bend the glass sheet 24, as shown in FIG. 7. In the embodiment shown in FIG. 7, the bending surface 60 is preferably formed in a convex shape with respect to the conveying direction and has a substantially constant curvature. Thus, the shape of the bending surface 60 is transferred to the glass sheet 24. Among the rolls that raise the belt, the pressing rolls 75 for pressing the glass sheet 24 against the bending surface 60 are previously set in such a manner that the belt 25 can be raised to a position along the bending surface 60. Furthermore, the end rolls 76, 77 are lifted to a position at which a suitable tension is retained.

The number of the pressing rolls 75 can be suitably determined depending on the desired shape of the bent glass sheet, but in general, at least two rolls are needed. The number of rolls 75 is preferably at least five.

Figure 8:
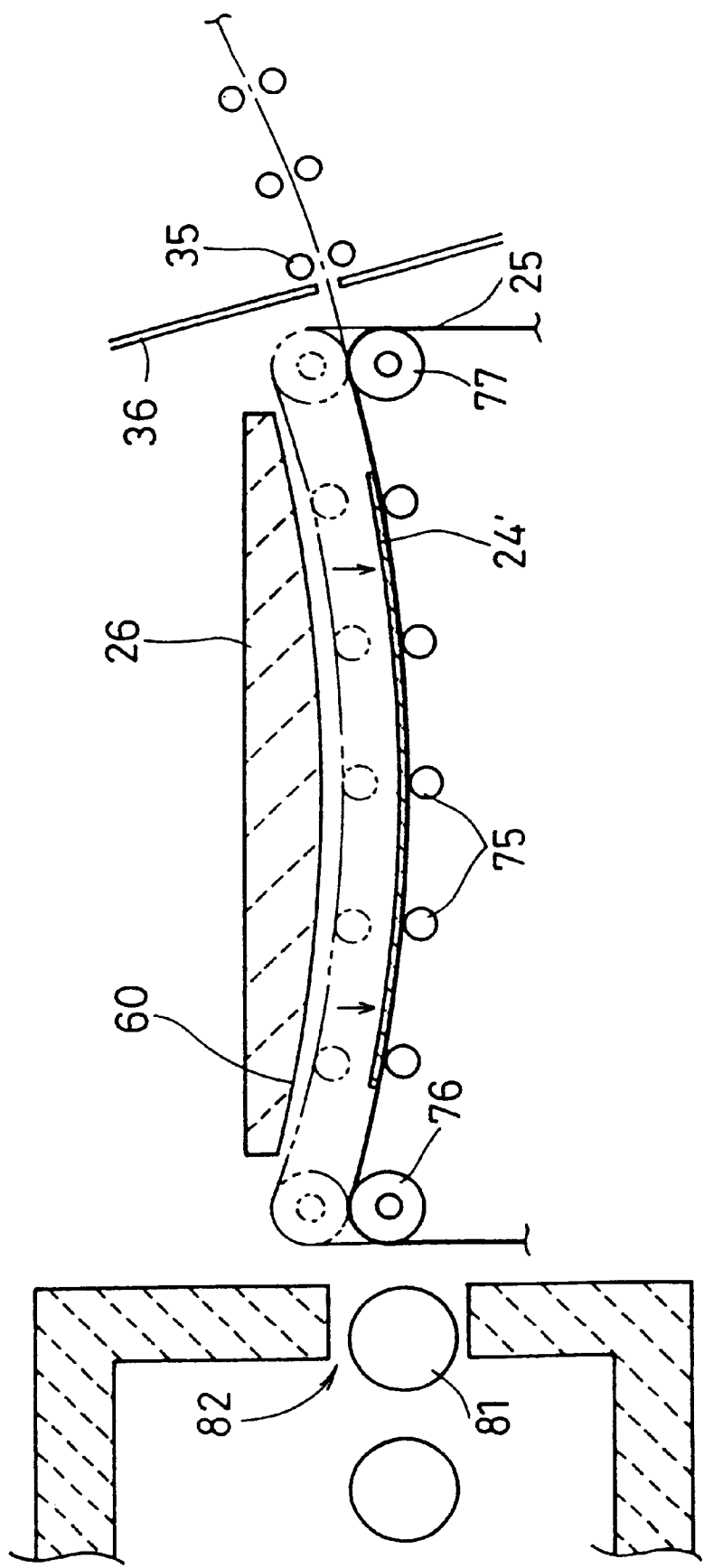
FIG. 8 is a cross-sectional view showing the state after bending the glass sheet in the bending section shown in FIG. 6 and before conveying the glass sheet to a quenching apparatus.

After bending, as shown in FIG. 8, the rolls are lowered while maintaining the arrangement having the convex shape. At this time, the glass sheet 24' still has a high temperature. However, the belt 25 is lowered while maintaining the shape along the curved surface of the glass sheet, so that the Glass sheet 24' can be lowered while maintaining a stable state.

Figure 9:
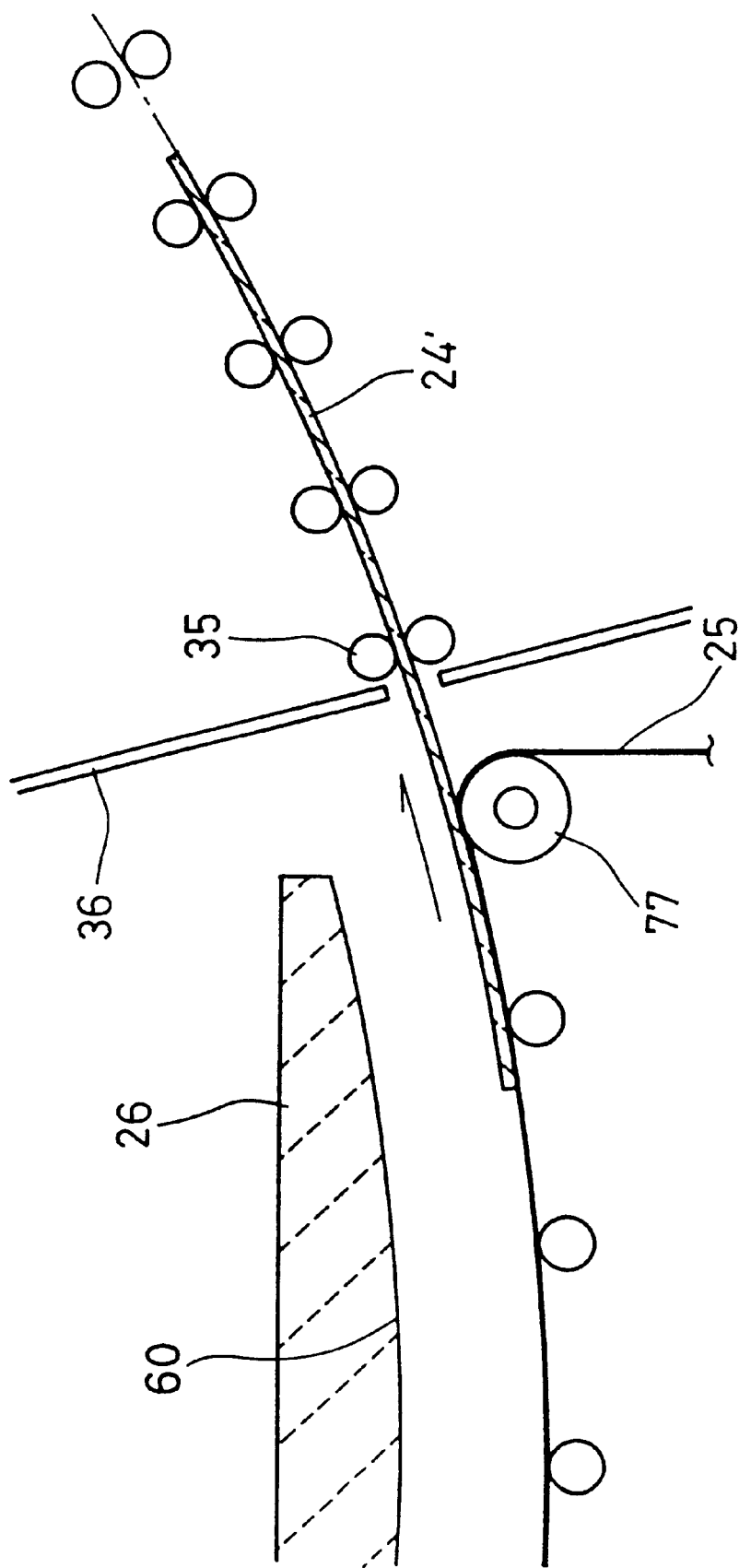
FIG. 9 is a cross-sectional view showing the state after bending the glass sheet in the bending section shown in FIG. 6 and while conveying the glass sheet to a quenching apparatus.

As shown in FIG. 8, the glass sheet 24' is lowered to a position from which the glass sheet 24' can be conveyed to the quenching apparatus 23. The position is preferably on the extension of the arc described by the conveying path 43 having a constant curvature in the quenching apparatus 23. At this time, it is preferable to accurately control especially the position of the roll 7 among the rolls. From this position, the bent glass sheet 24' is conveyed by the belt 25 along the curved surface having a constant curvature, and introduced into the quenching apparatus 23 through a port between partition plates 36, as shown in FIG. 9. As described above, the direction in which the glass sheet can be conveyed from the bending position to the quenching apparatus 23 is not the horizontal direction, but a direction along the extension of the curve formed by the cross section of the glass sheet with respect to the conveyance direction. By following the conveying path 43 in the above direction, the glass sheet 24' can be introduced to the quenching apparatus 23 in a stable state.

In the quenching apparatus 23, the glass sheet is quenched by blowing cooling air from a cooling gas blowing nozzle (not shown) while being conveyed by rolls 35. At this time as well, the glass sheet 24' is substantially conveyed along the arc described above. By quenching the glass sheet while being conveyed in such a direction, the glass sheet easily can be conveyed stably and cooled uniformly starting from the surface.

In the example described above, the rolls 27 work as glass sheet pressing members and belt supporting members. The present invention is not limited thereto, and other embodiments are possible. For example, another bending member may be prepared below the conveying path, and the added bending member may be used as the glass sheet pressing member and the belt supporting member. Furthermore, the upper bending member 26 may be lowered so as to press the glass sheet, instead of the glass sheet being raised by rolls 27.

Figure 10:
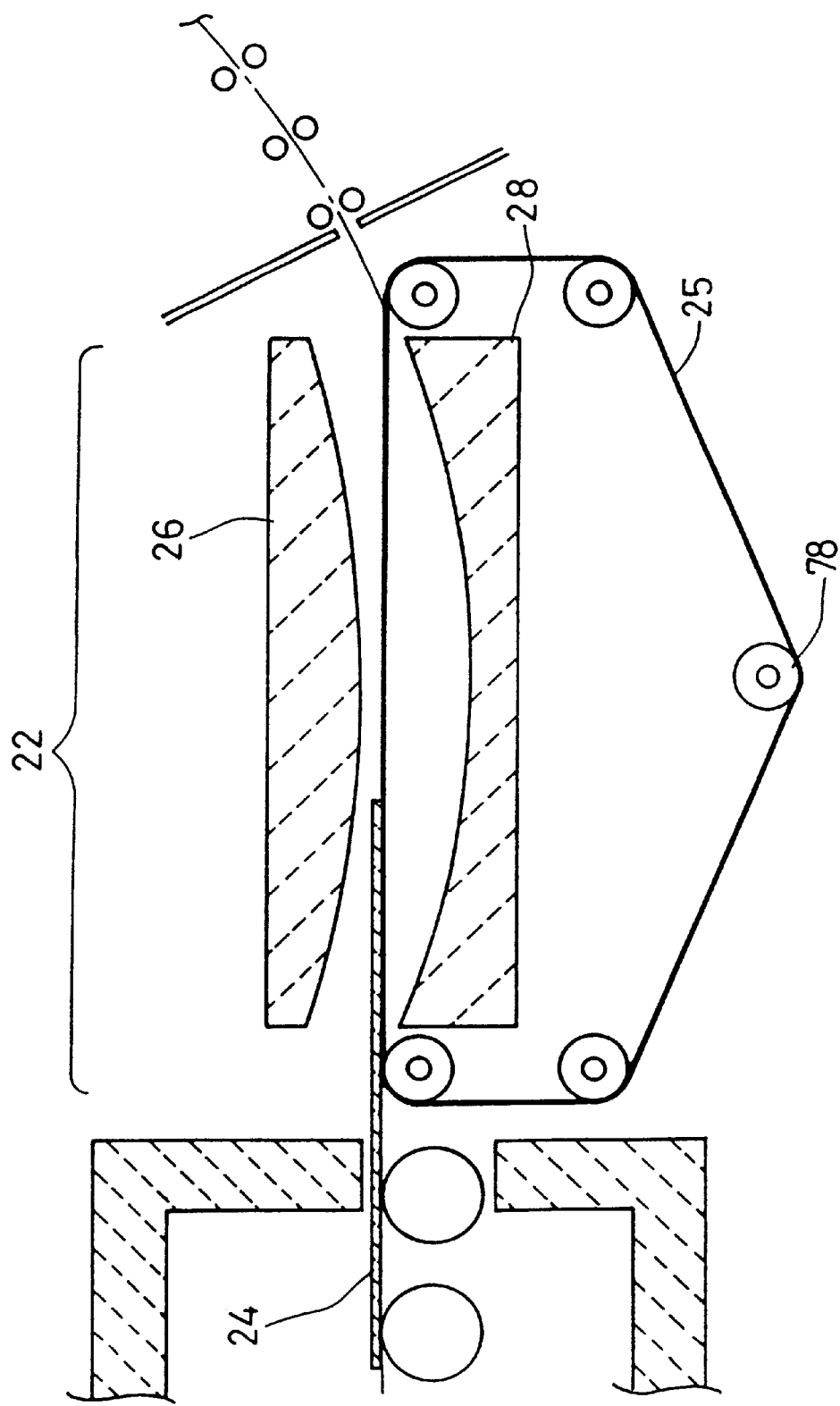
FIG. 10 is a cross-sectional view showing the vicinity of a bending section of another embodiment of the apparatus of the present invention.
Figure 11:
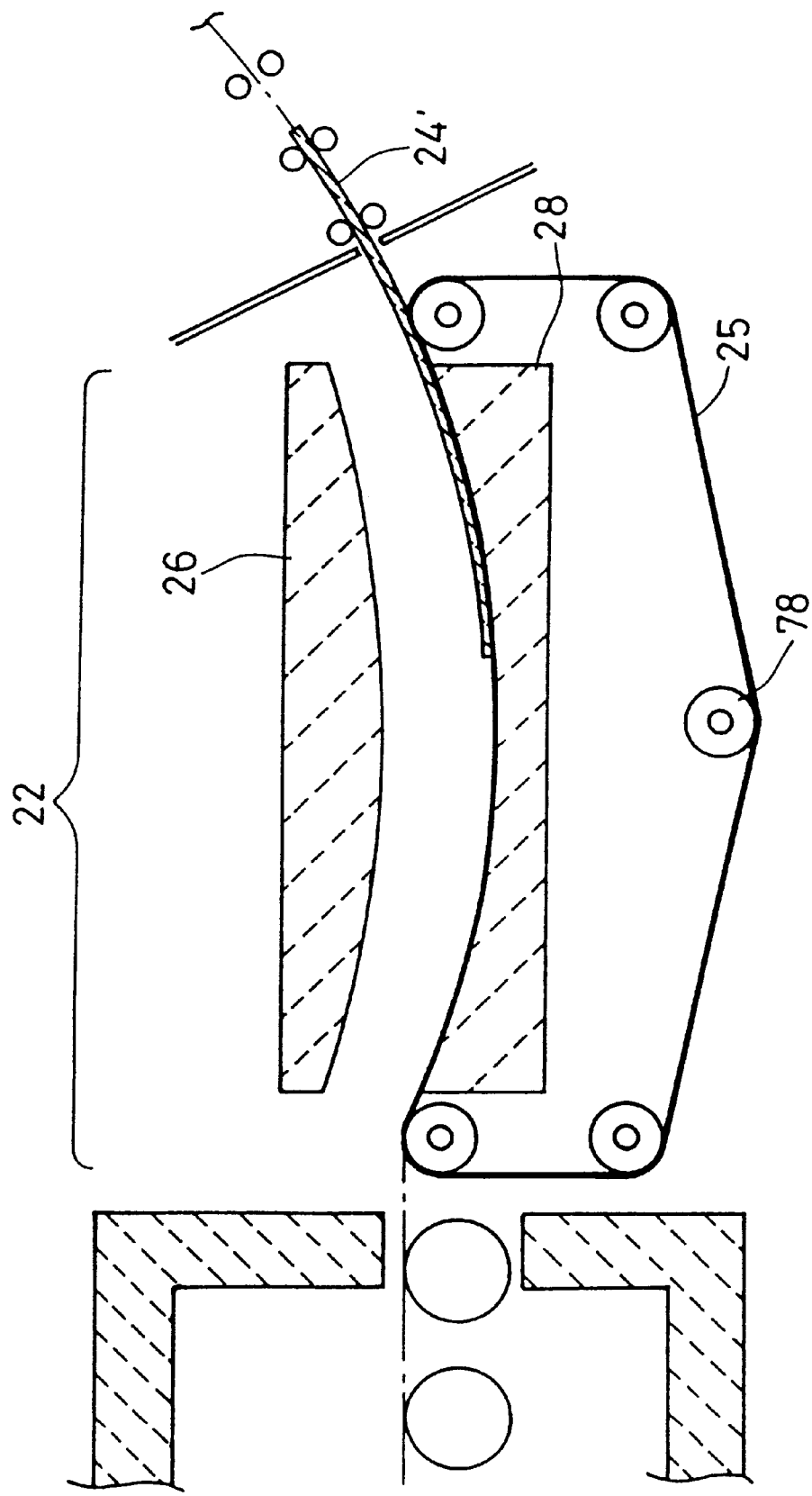
FIG. 11 is a cross-sectional view showing the state after bending the glass sheet in the bending section shown in FIG. 10 and while conveying to a quenching apparatus.

The bending apparatus 22 shown in FIGS. 10 and 11 illustrates such a modified embodiment, where a bending member 28 is used as the belt supporting member. As shown in FIGS. 10 and 11, a bending process in this case is performed by conveying a glass sheet 24 from a healing furnace 21 to a bending position by a belt 25, and lifting a tension roll 78 upward so as to release the tension of the belt 25 while lowering an upper bending member 26 so as to press the glass sheet 24 between the upper bending member 26 and the lower bending member 2S. Furthermore, the bent glass sheet 24' is conveyed to a quenching apparatus 23 by reversing the bending member 26 upward and moving the belt 25 while supporting the glass sheet 24'. According to such an embodiment including a pair of bending members and a belt tension adjusting mechanism, rolls for forming the shape of the surface of the glass sheet are not required, and an operation of arranging the rolls along the shape of the surface of the glass sheet is not necessary in a bending process, thus simplifying the apparatus and the process.

Embodiment 5

Figure 12:
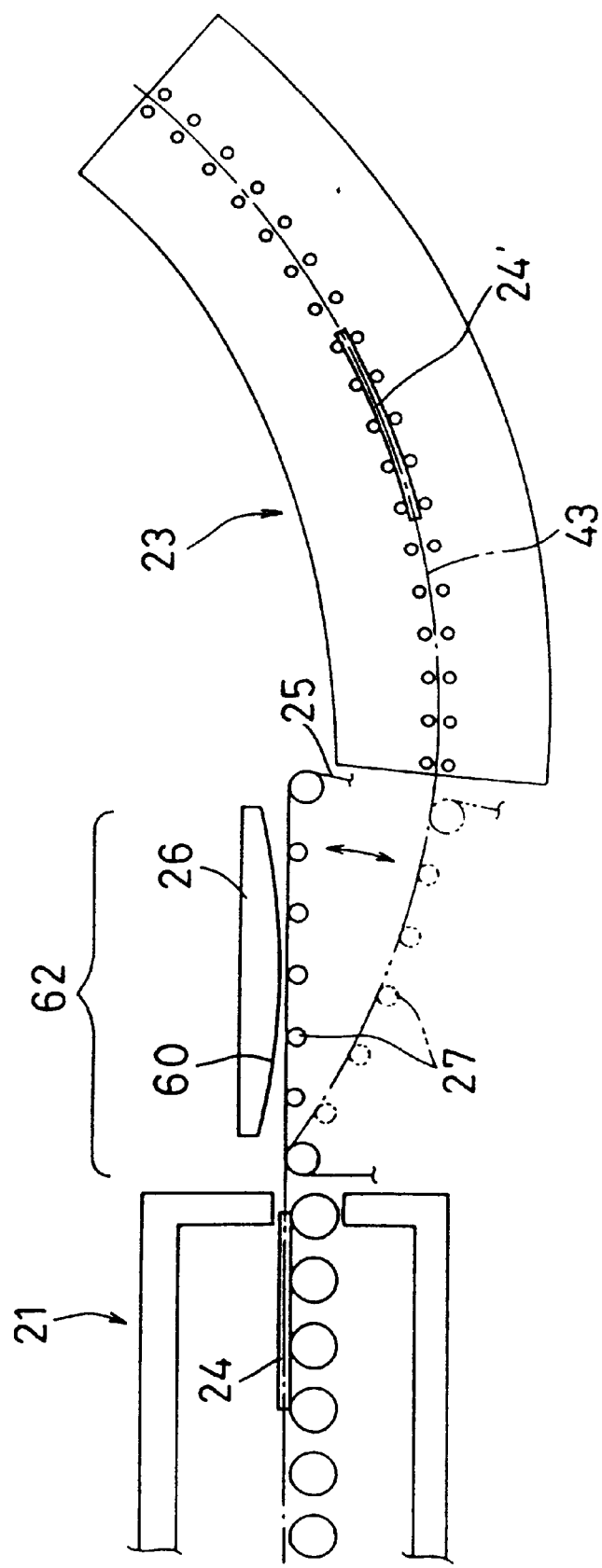
FIG. 12 is a cross-sectional view showing still another embodiment of an apparatus for producing a bent glass sheet of the present invention.
Figure 13:
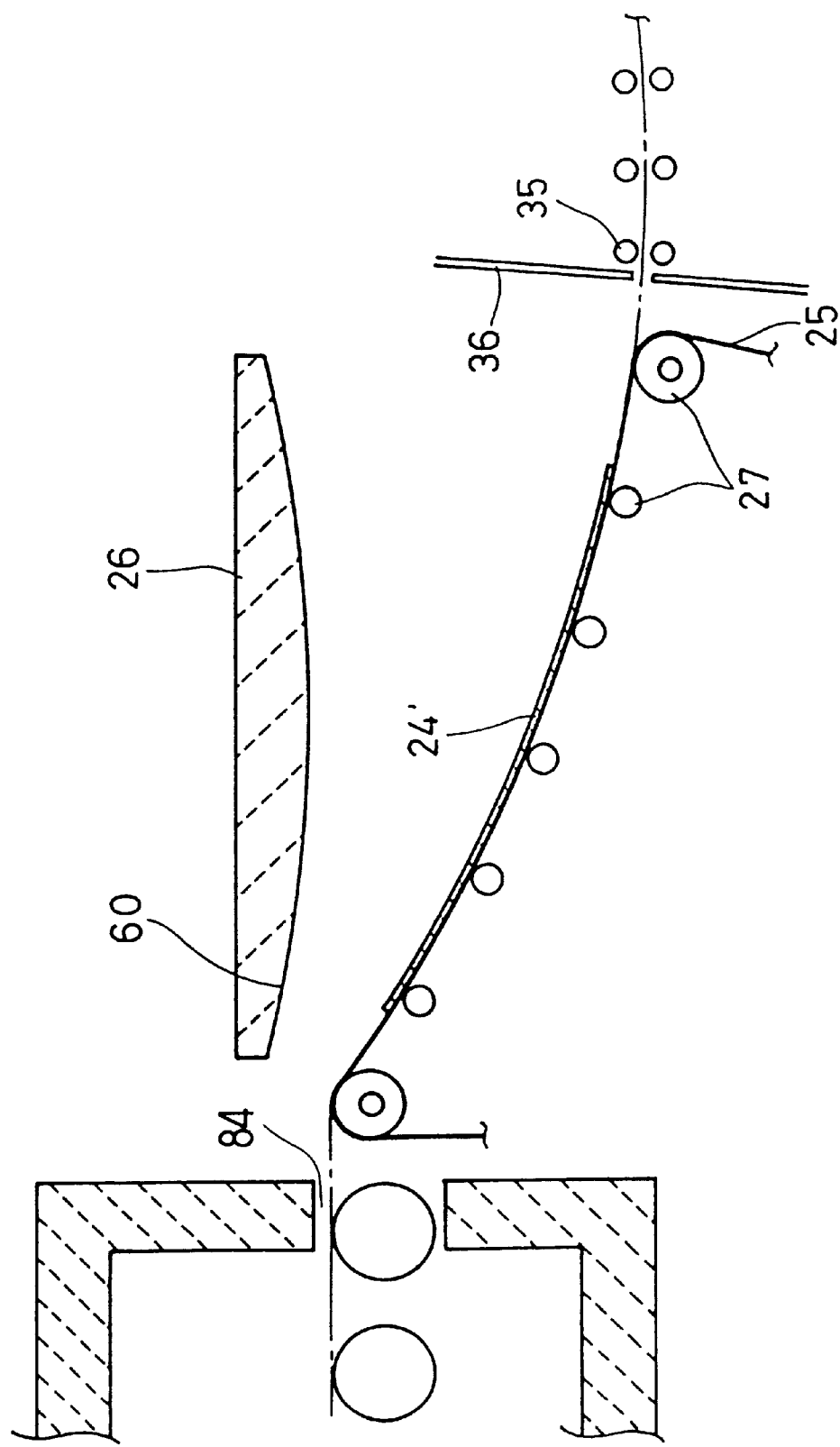
FIG. 13 is a cross-sectional view showing the state after bending the glass sheet in the bending section shown in FIG. 12 and before conveying the glass sheet to a quenching apparatus.
Figure 14:
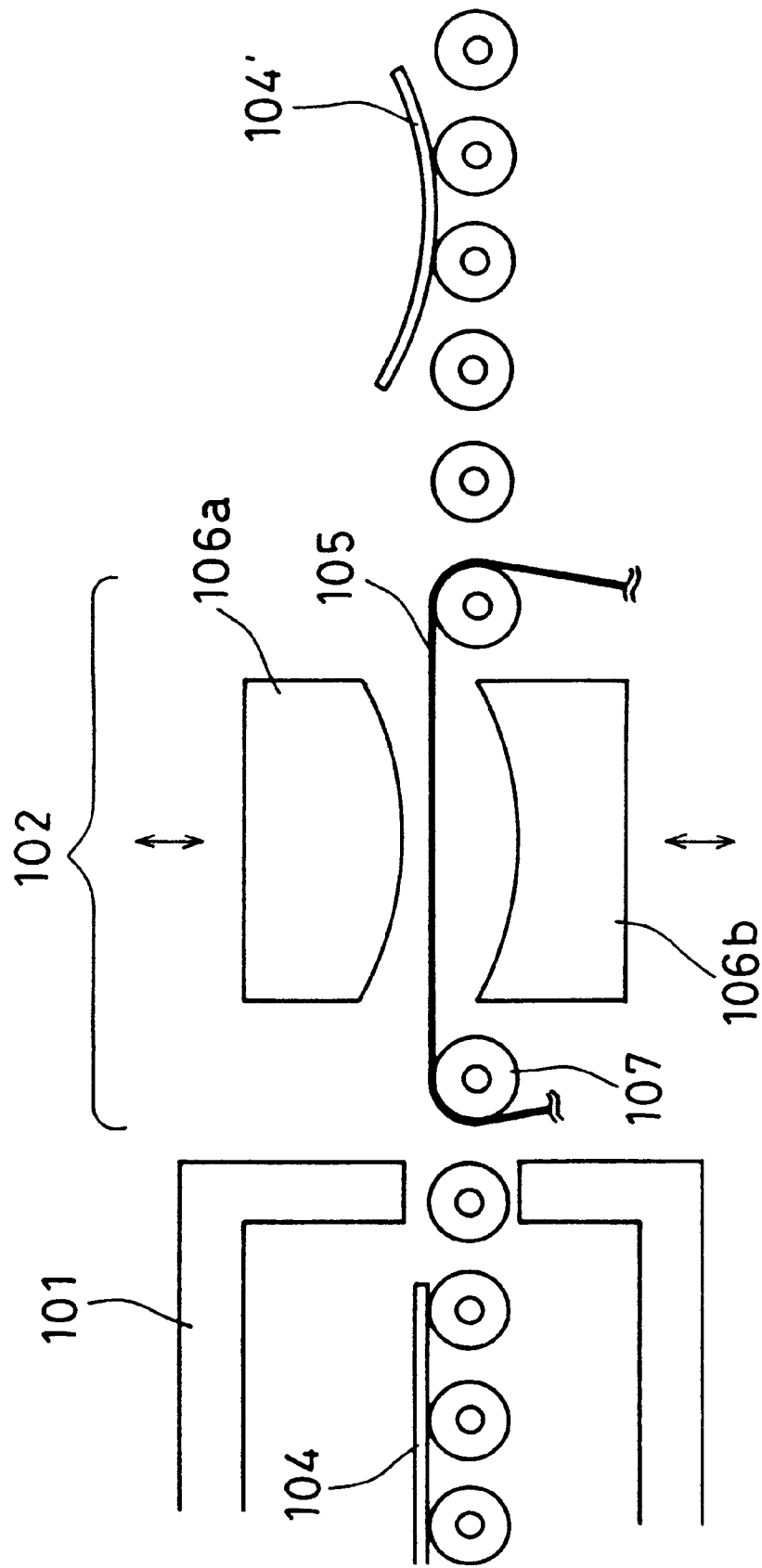
FIG. 14 is a cross-sectional view showing a conventional apparatus for producing a curved and tempered glass sheet.

FIG. 12 is a cross-sectional view showing another embodiment of the production apparatus of the present invention. This apparatus has the same structure as shown in FIG. 5, except for the position relationship between the bending apparatus 62 and the quenching apparatus 23. This production apparatus is characterized in that the port of the quenching apparatus (a port between the partition plates 36) is located lower than the outlet 32 of the heating furnace, as more specifically shown in FIG. 13.

In this embodiment, the bent glass sheet 24' changes its attitude before conveying the glass sheet to the quenching apparatus 23. The belt 25 supports the bent glass sheet along the curved surface while changing the attitude so as to convey the glass sheet to the quenching apparatus.

According to the embodiment, the bent glass sheet 24' is carried into the quenching apparatus 23 through the port positioned lower than the position from which the glass plate 24' is introduced to the bending apparatus 62. Therefore, although the belt 25 and the rolls 2, move in a wider range, the glass sheet is positioned lower after quenching in the quenching apparatus 23, and the angle of the glass plate itself is closer to the horizontal direction than in the apparatus as shown in FIG. 5. Thus, this lower position provides the advantage of facilitating the handling of the glass plate in a subsequent process.

INDUSTRIAL APPLICABILITY OF THE INVENTION

As described above, according to the present invention, bent glass, sheets having surfaces on which defects such as marks of rolls are suppressed can be produced efficiently. The bent glass sheets produced by the present invention are useful for windows of vehicles or the like.

What is claimed is:

1. A method for producing a bent glass sheet comprising the steps of:
   heating a glass sheet in a heating furnace to a temperature at which the glass sheet becomes changeable in shape,
   conveying the glass sheet out from the heating furnace,
   bending the glass sheet by pressing the glass sheet with at least one belt made of a heat-resistant material against a bending member, and
   cooling the glass sheet for quenching or annealing after separating the glass sheet from the belt,
      wherein the glass sheet is bent so as to have a predetermined curvature with respect to a direction in which the glass sheet is conveyed, and the glass sheet is cooled while conveying the glass sheet along an arc described by extending the curved surface of the glass sheet in the direction of travel.

2. The method for producing a bent glass sheet according to claim 1, wherein the belt is kept along the surface of the glass sheet until the glass sheet separates from the belt.

3. The method for producing a bent glass sheet according to claim 1, wherein the glass sheet is gradually bent as the glass sheet is conveyed with the belt.

4. The method for producing a bent glass sheet according to claim 3, wherein the glass sheet is conveyed with the belt so that the glass sheet gradually deviates from a direction in which the glass sheet is conveyed from the heating furnace.

5. The method for producing a bent glass sheet according to claim 1, wherein the glass sheet is bent while sandwiching the glass sheet between a pair of the belts.

6. The method for producing a bent glass sheet according to claim 1, wherein the glass sheet is conveyed from the heating furnace to a pressing position and bent at the pressing position.

7. The method for producing a bent glass sheet according to claim 6, further comprising a step of changing an attitude of the glass sheet while supporting the glass sheet with the belt before separating the glass sheet from the belt.

8. An apparatus for producing a bent glass sheet comprising:
   a heating furnace for heating a glass sheet to a temperature at which the glass sheet becomes changeable in shape,
   a bending apparatus adjacent to the heating furnace, the bending apparatus including a bending member having a curved surface for bending the glass sheet, and at least one belt made of a heat resistant material, wherein the belt is pressed against the curved surface of the bending member with the glass sheet when bending the glass sheet, and
   a cooling apparatus for quenching or annealing the glass sheet adjacent to the bending apparatus,
      wherein the cooling apparatus includes a curved conveying path for the glass sheet having a predetermined curvature with respect to a direction in which the glass sheet is conveyed.

9. The apparatus for producing a bent glass sheet according to claim 8, wherein the bending apparatus further includes a belt driving apparatus for driving the belt with the glass sheet.

10. The apparatus for producing a bent glass sheet according to claim 9, wherein the belt driving apparatus drives the belt while keeping the belt along the surface of the glass sheet.

11. A The apparatus for producing a bent glass sheet according to claim 9, wherein the belt driving apparatus includes a roll for controlling tension of the belt.

12. The apparatus for producing a bent glass sheet according to claim 8, wherein the bending apparatus includes a curved conveying path for the glass sheet along the curved surface of the bending member.

13. The apparatus for producing a bent glass sheet according to claim 12, wherein the curved conveying path in the bending apparatus gradually deviates from a direction in which the glass sheet is conveyed from the heating furnace.

14. The apparatus for producing a bent glass sheet according to claim 12, wherein the curved conveying path is sandwiched between a pair of the belts.

15. The apparatus for producing a bent glass sheet according to claim 8, wherein the bending member has a predetermined curvature with respect to a direction in which the glass sheet is conveyed.

16. The apparatus for producing a bent glass sheet according to claim 8, wherein the bending apparatus includes a belt temperature controller.

17. A method for producing a bent glass sheet comprising the steps of:
   heating a glass sheet in a heating furnace to a temperature at which the glass sheet becomes changeable in shape,
   conveying the glass sheet out from the heating furnace,
   bending the glass sheet by pressing the glass sheet with at least one belt made of a heat-resistant material against a bending member, and
   cooling the glass sheet for quenching or annealing after separating the glass sheet from the belt,
      wherein the glass sheet is gradually bent by pressing the glass sheet with the belt against the bending member as the glass sheet is conveyed with the belt along the bending member.

18. The method for producing a bent glass sheet according to claim 17, wherein the belt is kept along the surface of the glass sheet until the glass sheet separates from the belt.

19. The method for producing a bent glass sheet according to claim 17, wherein the glass sheet is bent so as to have a predetermined curvature with respect to a direction in which the glass sheet is conveyed.

20. The method for producing a bent glass sheet according to claim 17, wherein the glass sheet is cooled while conveying the glass sheet.

21. The method for producing a bent glass sheet according to claim 17, wherein the glass sheet is cooled while conveying the glass sheet along an arc described by extending the curved surface of the glass sheet in the direction of travel.

22. The method for producing a bent glass sheet according to claim 17, wherein the glass sheet is conveyed with the belt so that the glass sheet gradually deviates from a direction in which the glass sheet is conveyed from the heating furnace.

23. The method for producing a bent glass sheet according to claim 17, wherein the glass sheet is bent while sandwiching the glass sheet between a pair of the belts.

24. An apparatus for producing a bent glass sheet comprising:

a heating furnace for heating a glass sheet to a temperature at which the glass sheet becomes changeable in shape, a bending apparatus adjacent to the heating furnace, the bending apparatus including a bending member having a curved surface for bending the glass sheet, and at least one belt made of a heat resistant material, wherein the belt is pressed against the curved surface of the bending member with the glass sheet when bending the glass sheet, and a cooling apparatus for quenching or annealing the glass sheet adjacent to the bending apparatus, wherein the bending apparatus includes a curved conveying path for the glass sheet along the curved surface of the bending member.

25. The apparatus for producing a bent glass sheet according to claim 24, wherein the bending apparatus further includes a belt driving apparatus for driving the belt with the glass sheet.

26. The apparatus for producing a bent glass sheet according to claim 25, wherein the belt driving apparatus drives the belt while keeping the belt along the surface of the glass sheet.

27. The apparatus for producing a bent glass sheet according to claim 25, wherein the belt driving apparatus includes a roll for controlling tension of the belt.

28. The apparatus for producing a bent glass sheet according to claim 24, wherein the curved conveying path in the bending apparatus gradually deviates from a direction in which the glass sheet is conveyed from the heating furnace.

29. The apparatus for producing a bent glass sheet according to claim 24, wherein the curved conveying path is sandwiched between a pair of the belts.

30. The apparatus for producing a bent glass sheet according to claim 24, wherein the bending apparatus includes a belt temperature controller.

31. The apparatus for producing a bent glass sheet according to claim 24, wherein the cooling apparatus includes a curved conveying path for the glass sheet having a predetermined curvature with respect to a direction in which the glass sheet is conveyed.

* * * * *